No. 799,891. PATENTED SEPT. 19, 1905.
D. CRANE.
DEVICE FOR UNITING WOODEN STAVES.
APPLICATION FILED FEB. 14, 1905.

Witnesses,
Chas. E. Chapin.

Inventor,
Donald Crane
By Geo. H. Strong, atty.

UNITED STATES PATENT OFFICE.

DONALD CRANE, OF SAN FRANCISCO, CALIFORNIA, ASSIGNOR OF ONE-HALF TO GEO. W. POLLIS, OF SAN FRANCISCO, CALIFORNIA.

DEVICE FOR UNITING WOODEN STAVES.

No. 799,891.     Specification of Letters Patent.     Patented Sept. 19, 1905.

Application filed February 14, 1905. Serial No. 245,588.

*To all whom it may concern:*

Be it known that I, DONALD CRANE, a citizen of the United States, residing in the city and county of San Francisco and State of California, have invented new and useful Improvements in Devices for Uniting Wooden Staves, of which the following is a specification.

The object of my invention is to provide a device and means for the convenient preparation of the ends of wooden staves and like timbers which it is desired to unite in line with each other and to make a tight joint at the union.

It consists, essentially, in the formation of grooves or channels in the abutting ends, said grooves or channels being made to coincide and register by means of a specially-formed tool for this purpose, and the channels thus formed serve to receive metallic plates which project into each channel, and thus unite the ends so as to form tight joints.

Figure 1:
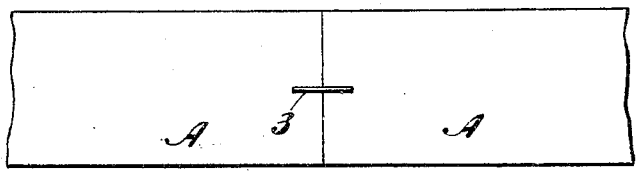
Figure 2:
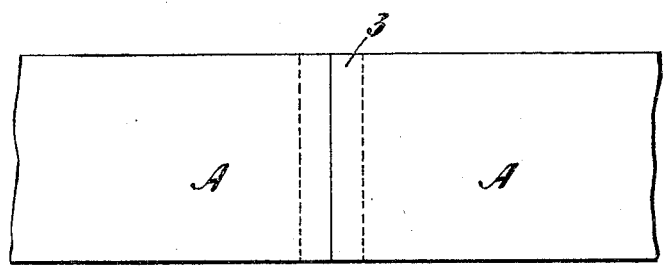
Figure 3:
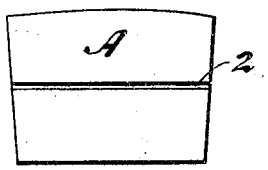
Figure 4:
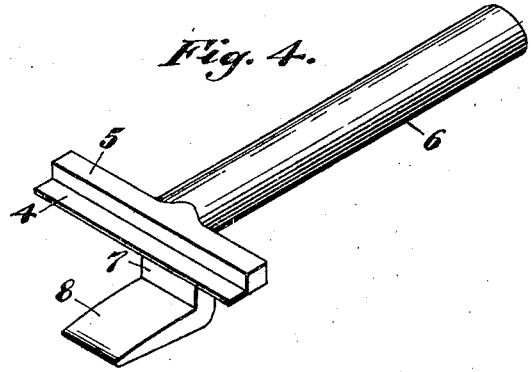

Referring to the accompanying drawings, Figure 1 is a side view showing stave-joint. Fig. 2 is a plan view of same. Fig. 3 is an end view of stave, showing slot. Fig. 4 is a perspective view of grooving-tool.

In the formation of stave-cylinders for wooden pipe and like purposes the staves must be abutted at intervals in order to provide the required length, and it is difficult to make these abutting joints sufficiently tight. In order to make such joints and to cause the abutting ends to fit closely, the ends are properly squared and grooves or channels are cut across the ends, and in these grooves or channels are fitted iron plates, and when the ends thus prepared are driven close together they will be water-tight. Such staves are usually of considerable length, and if the channels are to be cut by a saw the staves must be all handled and placed upon a carriage, by which they are presented to the saw.

In my invention I employ a special tool, so constructed that the ends of the staves can all be prepared while they are piled up and without removing the staves.

As shown in the drawings, A A represent two staves the abutting ends of which are to be joined. 2 represents slots or channels made in the ends of these staves and extending from side to side in the direction of the circumference of the pipe of which the staves form a part. Within these grooves are fitted plates 3, which form tenons and a tight joint when the ends have been driven close together upon these plates.

4 is a blade which I employ for forming the channels to receive the plates. This blade has preferably an edge of approximately the same thickness as the plate to be employed, and the length is sufficient to make a cut from one side to the other of the stave. The blade has preferably little or no taper from the edge backward and is of just sufficient depth to cut a channel equal to one-half the width of the plate which is to form the tenon. This blade may be formed with or attached to a heavier stop-bar 5, having the same length, and extending backwardly and at right angles from this bar and the blade is a sufficiently-heavy handle or shank 6, so that when the edge of the blade is placed upon the end of the stave or piece to be channeled and the handle struck with a hammer the blade will be forced into the wood in the direction of the grain thereof and will compress the fibers of the wood in advance of it to a depth equal to the width of the blade. This by reason of the form of the blade will have little or no tendency to split the stave, and when the uniting tenon-plates have been fixed in place the wood will swell when subjected to moisture and will make a very tight joint.

In order to provide a gage for the blade so that all the grooves or channels will be made exactly the same distance from the surface of the stave, I have shown an arm 7 extending at right angles with the blade and having a guide portion 8, whose distance from the blade will be equal to the distance at which it is desired to have the channel from the surface of the stave.

The use of the device will then be as follows: The staves may be piled up with the ends presented, and the operator has only to place the edge of the tool against the stave, the gage 8 determining its position. Then striking it a sufficient number of blows with the hammer the blade will be forced into the end of the stave and the groove formed. The staves may thus be rapidly prepared without moving them from their position until needed to form the tube. Then, the tenon-plate being placed in one of the channels and the other channel placed upon the plate, by driving the staves together until the abutting ends fit tightly the joint will be completed, and thus any length of water or other pipe may be made and tight joints formed.

Having thus described my invention, what I claim, and desire to secure by Letters Patent, is—

1. A means for mortising the ends of staves to be united, said means comprising a blade having a blunt edge of approximately the thickness of the mortise to be made and a depth substantially one-half of the mortise to be formed in the adjacent ends of a pair of staves, a stop-bar at the base of the blade and thicker than the latter, and a shank or handle portion rigid with and extending at right angles from the stop-bar and adapted as an anvil to receive the blows of a hammer.

2. A means for mortising the ends of staves to be united, said means comprising a blade having a blunt edge and a length, depth, and thickness substantially equal to that of the proposed channel, a stop-bar at the base of the blade and of greater thickness than said blade and extending substantially the length thereof, a shank extending at right angles from the stop-bar and adapted as an anvil to receive percussive blows, and a right-angled gage-bar extending from the stop-bar said gage-bar, stop-bar, blade and shank constituting a rigid unitary structure.

In testimony whereof I have hereunto set my hand in presence of two subscribing witnesses.

DONALD CRANE.

Witnesses:
S. H. NOURSE,
HENRY P. TRICOU.